United States Patent [19]
Richmond

[11] 3,721,325
[45] March 20, 1973

[54] FREE WHEELING COUPLING
[75] Inventor: Nelson R. Richmond, Enfield, Conn.
[73] Assignee: Kaman Aerospace Corporation, Bloomfield, Conn.
[22] Filed: Aug. 18, 1971
[21] Appl. No.: 172,771

[52] U.S. Cl. ..................... 192/67 A, 192/46, 192/94
[51] Int. Cl. ..................... F16d 23/02, F16d 41/12
[58] Field of Search ................. 192/42, 46, 67 A, 94

[56] References Cited

UNITED STATES PATENTS

| | | | |
|---|---|---|---|
| 3,458,021 | 7/1969 | Clements et al. | 192/67 A |
| 2,077,253 | 4/1937 | Nardone | 192/42 X |
| 2,976,974 | 3/1961 | Blyth | 192/67 A |

FOREIGN PATENTS OR APPLICATIONS

| | | | |
|---|---|---|---|
| 205,050 | 3/1955 | Australia | 192/67 A |

*Primary Examiner*—Allan D. Hermann
*Attorney*—Roger B. McCormick et al.

[57] ABSTRACT

A rotary coupling for connecting a driven part to a source of power transmits power in one direction only and permits the driven part to free wheel when the speed of the output member of the coupling is greater than that of the input member. The coupling includes an input member in the form of a shaft, and an output member and a coupling member both mounted on the input shaft and having co-engageable sets of axially facing, radially extending clutch teeth. A helical spline connected between the coupling member and the input shaft and a ratchet mechanism between the coupling member and the output member effects the engagement and disengagement of the teeth by moving the coupling member axially toward and away from the output member. The output member is backed up by a conical seating surface on the input shaft against which it is urged by the coupling member during power transmitting engagement of the two sets of teeth to form the parts into a rigid unit and to locate the output member axially and concentrically with the input shaft.

10 Claims, 4 Drawing Figures

PATENTED MAR 20 1973  3,721,325
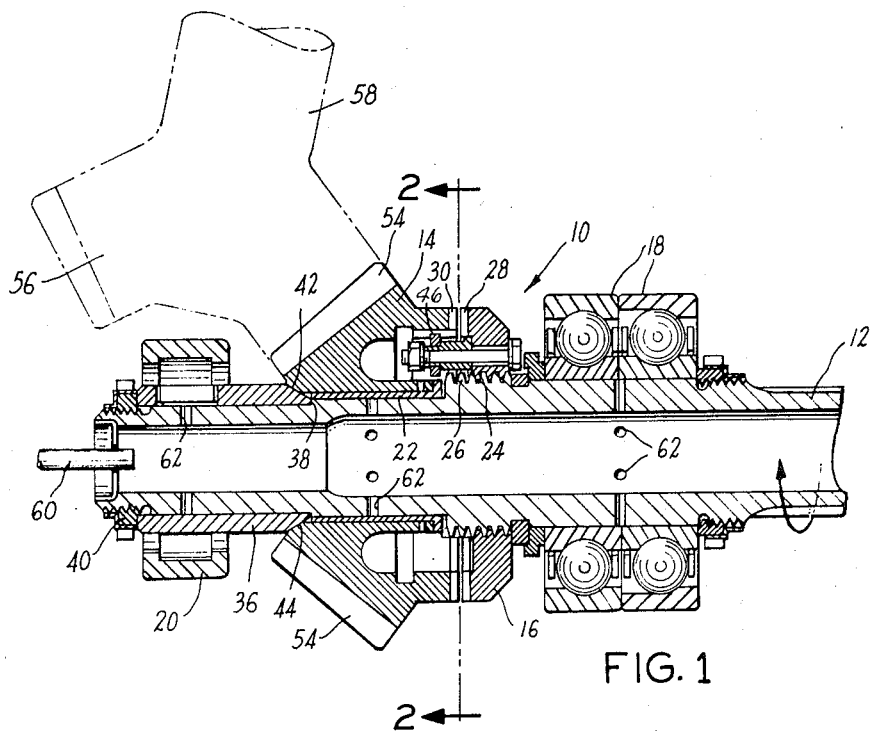
FIG. 1
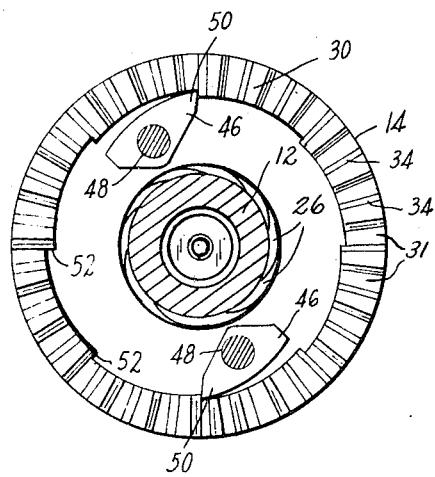
FIG. 2
FIG. 3
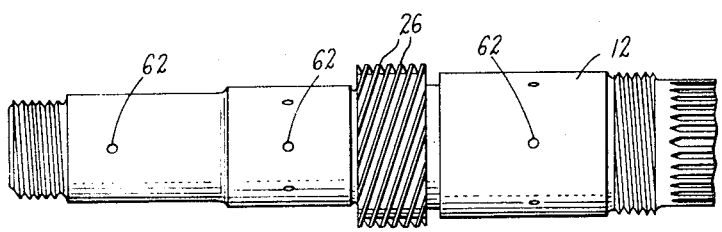
FIG. 4
Inventor
Nelson R. Richmond
By McCormick, Paulding & Huber
Attorneys

FREE WHEELING COUPLING

BACKGROUND OF THE INVENTION

This invention relates to rotary power transmitting couplings, and deals more particularly with such a coupling wherein the output member of the coupling is enabled to free wheel relative to the input member when the speed of the output member exceeds that of the input member.

One type of free wheeling coupling, well known in the art and exemplified by U.S. Pat. No. 3,197,001, includes input and output members and an axially shiftable coupling member connected to the input member by helical splines and having a set of clutch teeth movable between engaged and disengaged positions relative to a complementary set of clutch teeth on the output member as a result of its axial shifting movement. The axial shifting movement of the coupling member is in turn controlled by an overrunning ratchet and pawl mechanism working between the coupling member and the output member. Previous couplings of this type have, however, generally been of relatively complicated construction and have in many instances been limited to use at relatively light loads and speeds.

The aim of this invention is to provide an improved free wheeling coupling of the foregoing general type which is of a simplified construction and which is capable of being made relatively compact and light-weight while nevertheless being capable of handling high loads at relatively high speeds. In particular, the coupling of this invention is one which may readily be utilized to connect the output of a high speed turbine to a driven member as, for example, in a helicopter where it may be used to connect the output of a turbine engine to the rotor drive shaft.

SUMMARY OF THE INVENTION

This invention resides in a free wheeling rotatable coupling for connecting a power source to a driven part and involves primarily the construction and cooperative arrangement of the input member, output member and coupling member. The output member is loosely mounted on the input member for rotation relative thereto and the coupling member is connected to the input member by co-engaging helical splines so that as the coupling member moves angularly relative to the input member it is also shifted axially. The output member and the coupling member have coengageable axially facing sets of clutch teeth which extend generally radially of and surround the axis of rotation of the input member, and a ratchet and pawl mechanism working between the coupling member and the output member controls the movement of the coupling member to effect engagement and disengagement of the teeth. A seat is formed on the input member and the output member is located between such seat and the coupling member so that when the coupling member is moved toward its engaged position relative to the output member it axially urges the output member against the seat to clamp it between the seat and the coupling member thereby effectively making the output member, input member and coupling member a single rigid unit. The seat is preferably conical so as to have a centering as well as an axially limiting influence on the output member and the output member may be a bevel gear having bevel gear teeth facing generally in the opposite axial direction from its clutch teeth.

BRIEF DESCRIPTION OF THE DRAWING

FIG. 1 is a longitudinal sectional view taken through a free wheeling coupling embodying this invention.

FIG. 2 is a transverse sectional view taken on the line 2—2 of FIG. 1.

FIG. 3 is an elevational view of the coupling member of the coupling of FIG. 1.

FIG. 4 is an elevational view of the input shaft of the coupling of FIG. 1.

DETAILED DESCRIPTION OF THE PREFERRED EMBODIMENT

Referring first to FIG. 1, a coupling embodying this invention is there indicated generally at 10 and comprises an input member 12, an output member 14 and a coupling member 16. The input member 12 is in the form of a hollow shaft the right-habd portion of which does not form part of the coupling and which is therefore omitted in the drawing. It will be understood, however, that the right-hand portion of the shaft 12 is adapted to be attached to a suitable source of power which normally rotates the shaft 12 in one direction of rotation as shown, for example, by the arrow in FIG. 1 about an axis of rotation coinciding with its longitudinal axis. The shaft 12 may, in fact, constitute the output shaft of a turbine engine. Two ball bearing units 18, 18 and one roller bearing unit 20 rotatably support the shaft 12.

The output member 14 is loosely received on the input shaft 12 for rotation relative to the shaft about the axis of rotation and a cylindrical hydrodynamic sleeve bearing 22 is interposed between the shaft and the output member.

The coupling member 16 surrounds the input shaft 12 and is connected thereto by means of a set of helical splines 24, 24 on the coupling member and a complementary set of helical splines 26, 26, shown best in FIG. 4, on the input shaft. These coengaging sets of helical splines allow the coupling member 16 to rotate relative to the input shaft 12 and cause it to be moved axially of the input shaft as a result of such relative rotation. FIG. 1 shows the coupling member 16 in a disengaged position relative to the output member 14 and from this position the coupling member may be moved toward the left to bring it to an engaged position relative to the output member.

Power transmission between the coupling member 16 and the output member 14, when the coupling member is in its engaged position, is effected by coengageable sets of clutch teeth on the coupling member and the output member. The clutch teeth of the coupling member are indicated at 28, 28 and those of the output member at 30, 30. They are formed on adjacent end faces of the coupling member and output member so as to axially face one another and extend generally radially of the axis of rotation. That is, the valleys between the individual teeth extend generally radially, the valleys of the member 14 being indicated at 31, 31 in FIG. 2, and the valleys of the member 16 being indicated at 29, 29 in FIG. 3. As shown best in FIGS. 2 and 3 the teeth 28 of the coupling member include power transmitting faces 32, 32 which are inclined relative to the rotational axis and which coengage with correspondingly inclined faces 34, 34 of the output member teeth 30 so as to permit the two sets of teeth to smoothly engage one another. Also, because of the inclined faces, when power is transmitted between the two members a force is exerted on the clutch teeth 28 of the coupling member by the clutch teeth 30 of the output member which aids to move the output member toward its disengaged position or to the right in FIG. 1.

The output member 14 is limited in its axial movement to the left in FIG. 1 by a collar 36 which is separate from the shaft 12 and which also forms the inner race of the roller bearing unit 20. The right end of the collar 36 bears against a shoulder 38 formed in the input shaft and it is retained on the input shaft by a retaining nut 40. The nut 40 clamps the collar 36 between itself and the shoulder 38 and thereby fixes the collar to the shaft 12 so as to be non-rotatable relative to the shaft. At its right-hand end the collar 36 has a generally radially extending seating surface 42, which is preferably of a conical shape as shown, and the output member 14 has a complementary seating surface 44. Therefore, the output member 14 is located between the seating surface 42 and the coupling member 16 so that when the coupling member is driven toward its engaged position, or to the left in FIG. 1, the output member 14 is urged against the seating surface 42 and clamped between it and the coupling member so as to effectively lock the coupling member, output member and input shaft to one another as a single rigid unit. The conical seating surfaces 42 and 44 precisely define the axial position of the output member when the coupling member 16 is in its engaged position and also center it accurately relative to the input member.

The movement of the coupling member 16 between its engaged and disengaged positions is controlled by a ratchet and pawl mechanism cooperating with the helical splines 24, 24 and 26, 26. As shown in FIGS. 1 and 2, this ratchet and pawl mechanism comprises two pawls 46, 46 rotatably received on two axially extending studs 48, 48 attached to the coupling member 16. The pawls 46, 46 have noses 50, 50 which cooperate with an interior surface of the output member 14 which is shaped to define a plurality of ratchet shoulders 52, 52. The noses 50, 50 are biased radially outwardly by centrifugal force and/or by torsion springs (not shown) working between each stud 48 and its pawl 46. The ratchet and pawl mechanism allows the coupling member to move in one direction relative to the output member but prevents it from moving in the opposite direction relative to the output member. The relationship between the ratchet and pawl mechanism and the helical splines 24, 24 and 26, 26 is such that, assuming the input shaft 12 and output member 14 to be stationary, rotation of the coupling member in the direction necessary to cause engagement of the pawls with the ratchet shoulders causes the coupling member to move toward the output member and so that rotation of the coupling member in the direction which causes the pawls to overrun the ratchet shoulders moves the coupling member away from the output member. Also, the inclined faces 34, 34 of the clutch teeth 30, 30 of the output member 14 are so located relative to the ratchet and pawl mechanism that as the cooperating inclined faces 32, 32 of the coupling member 16 move into full coengagement therewith the coupling member is rotated slightly by the camming action of the coengaging faces, relative to the output member to displace the pawl noses 50, 50 from the ratchet shoulders 52, 52, thereby completely unloading the ratchet and pawl mechanism.

The output member 14 may take various different forms, but in the preferred and illustrated case it consists essentially of a bevel gear having bevel gear teeth 54, 54 facing generally in the opposite direction from its clutch teeth 30, 30 and which mesh with, for example, the teeth of another bevel gear shown in phantom at 56 which rotates an output shaft 58 which may, in one application of the coupling, be the main rotor shaft of a helicopter.

Lubrication for the bearings 18, 18, 20, and 22 for the coupling is supplied by a tube 60 which discharges lubricant into the hollow interior of the input shaft 12. From there it is distributed by centrifugal force to the bearings and coupling through radial ports 62, 62 extending through the shaft. This lubricant forms a film on the interior surface of the output member 14 containing the ratchet shoulders 52, 52, over which film the pawls ride when overrunning the shoulders.

Considering the operation of the clutch 10 of FIG. 1, FIG. 1 shows the clutch in its disengaged condition with the output member 14 rotating in a free wheeling manner faster than the input shaft 12. Under this condition the output member rotates relative to the input shaft 12 on the hydrodynamic bearing 22 and the output member 14 rotates in the clockwise direction of FIG. 2 relative to the pawls 46, 46 so that the pawls override the ratchet shoulders 52, 52.

Assume now that the speed of the input shaft increases or the speed of the output member decreases so that the speeds of these two members approach equality. As soon as the speed of the input shaft 12 begins to slightly exceed the speed of the output member 14 the pawls 46, 46 engage ratchet shoulders 52, 52 to prevent relative movement between the coupling member 16 and the output member and thereafter the input shaft rotates relative to the coupling member and, by virtue of the helical spline connection between the input shaft and the coupling member, moves the coupling member 16 to the left in FIG. 1 bringing the two sets of clutch teeth 28, 28 and 30, 30 into engagement with one another. As the clutch teeth are brought into coengagement they themselves prevent further relative rotation between the coupling member and the output member and due to the inclination of their faces the output member and the coupling member are slightly angularly shifted relative to one another, as the teeth move from initial to full coengagement, to relieve the pawls of any loads. Although the inclination of the clutch teeth tend to exert a separating force between the coupling member and the output member, the mechanical advantage of the helical splines is much greater than that of the clutch teeth so that the coupling member is driven to the left by a considerable force, dependent on the amount of torque transmitted through the coupling and causes the output member to be urged against the conical seating surface 42 to form the various members into a rigid power transmitting unit. This engaged condition of the coupling persists so long as power is transmitted from the input shaft 12 to the output member 14 with the output member rotating at the same speed as the input shaft.

When the relative speeds of the input shaft and output member again change so that the output member 14 starts to move faster than the input shaft the coengaging clutch teeth first cause the coupling member to rotate in unison with the output member and relative to the input shaft in such a direction as to cause the helical spline connection to move the coupling member to the right as viewed in FIG. 1 toward its disengaged condition. After the disengaged condition is reached the coupling member rotates in unison with the input shaft with the pawls overriding the ratchet shoulders 52, 52.

I claim:

1. A free wheeling coupling comprising an input member rotatable about a given axis of rotation, an output member loosely received on said input member for rotation relative to said input member about said axis of rotation, a coupling member on said input member, said coupling member and said output member having coengageable axially facing sets of clutch teeth extending generally radially of and surrounding said axis of rotation, first means for moving said coupling member axially toward said output member to engage said two sets of clutch teeth in response to movement of said output member in one direction of rotation relative to said input member and for moving said coupling member axially away from said output member to disengage said two sets of clutch teeth in response to movement of said output member in the opposite direction of rotation relative to said input member, and means defining a generally radially extending first seating surface on said input member axially facing said output member, said output member being located between said first seating surface and said coupling member and having a second seating surface generally complementary to said first seating surface whereby when said coupling member is moved axially toward said output member it urges said two seating surfaces into coengagement and clamps said output member between said first seating surface and said coupling member.

2. A free wheeling coupling as defined in claim 1 further characterized by said first means comprising helical splines on said input member and said coupling member for causing said coupling member to move axially of said input member in response to relative rotation between said coupling member and said input member, and a ratchet and pawl mechanism between said coupling member and said output member permitting said coupling member to move in one direction relative to said output member and preventing said coupling member from moving in the opposite direction relative to said output member.

3. A free wheeling coupling as defined in claim 1 further characterized by said first and second seating surfaces being generally conical with their axes coincident with said axis of rotation.

4. A free wheeling coupling as defined in claim 1 further characterized by said output member including a set of bevel gear teeth for cooperation with a bevel gear connected to a driven part, said bevel teeth facing generally axially in the direction opposite from said clutch teeth of said output member.

5. A free wheeling coupling comprising an input member rotatable about a given axis of rotation and adapted for connection to a power source which normally rotates it in one direction of rotation, an output member loosely received on said input member for rotation relative to said input member about said axis of rotation, a coupling member, coengaging helical splines on said input member and said coupling member connecting said coupling member to said input shaft and causing said coupling member to be moved axially of said input member as said coupling member is moved angularly relative to said input member, said output member having a set of generally radially extending clutch teeth surrounding said axis of rotation and said coupling member having a complementary set of generally radially extending clutch teeth surrounding said axis of rotation, each of said sets of clutch teeth having generally radially extending valleys between the individual teeth thereof, said two sets of clutch teeth being arranged to axially face one another and said coupling member as a result of its axial movement relative to said input member being movable between an engaged position at which said two sets of clutch teeth mesh with one another to lock said output member against rotation relative to said input member and a disengaged position at which said two sets of teeth are out of mesh with one another to permit said output member to rotate relative to said input member, said coengaging helical splines on said input member and said coupling member being arranged so that rotation of said coupling member relative to said input member in said one direction of rotation moves said coupling member axially toward said disengaged position, and a ratchet and pawl mechanism between said coupling member and said output member which permits said output member to move relative to said coupling member in the direction opposite to said one direction of rotation and which prevents said coupling member from moving relative to said output member in said one direction of rotation.

6. A free wheeling coupling as defined in claim 5 further characterized by said two sets of clutch teeth having torque transmitting faces which in said engaged position of said coupling member engage one another and which are inclined relative to said axis of rotation, said two sets of clutch teeth being so arranged relative to said ratchet and pawl mechanism that as a result of said inclination said two sets of clutch teeth upon moving into full engagement with one another unload said ratchet and pawl mechanism.

7. A free wheeling coupling as defined in claim 5 further characterized by means defining a generally radially extending first seating surface on said input member axially facing said output member, said output member being located between said first seating surface and said coupling member and having a second seating surface generally complementary to said first seating surface whereby when said coupling member is axially moved to said engaged position it urges said two seating surfaces into tight coengagement and clamps said output member between said first seating surface and said coupling member.

8. A free wheeling coupling as defined in claim 1 further characterized by said two seating surfaces being generally conical in shape and concentric with said axis of rotation whereby their coengagement exerts a centering influence on said output member.

9. A free wheeling coupling comprising an input member rotatable about a given axis of rotation, an output member loosely received on said input member for rotation relative to said input member about said axis of rotation, a coupling member on said input member, said coupling member and said output member having coengageable sets of clutch teeth which are brought into engagement and disengagement with one another by movement of said coupling member axially toward and away from said output member, first means for moving said coupling member axially toward said output member to engage said two sets of clutch teeth in response to movement of said output member in one direction of rotation relative to said input member and for moving said coupling member axially away from said output member to disengage said two sets of clutch teeth in response to movement of said output member in the opposite direction of rotation relative to said input member, and means defining a generally radially extending first seating surface on said input member axially facing said output member, said output member being located between said first seating surface and said coupling member and having a second seating surface generally complementary to said first seating surface and said coupling member being limited in its axial movement toward said output member by engagement with said output member whereby when said coupling member is moved axially toward said output member it urges said two seating surfaces into coengagement and clamps said output member between said first seating surface and said coupling member.

10. A free wheeling coupling as defined in claim 9 further characterized by said first means comprising helical splines on said input member and said coupling member for causing said coupling member to move axially of said input member in response to relative rotation between said coupling member and said input member, and a ratchet and pawl mechanism between said coupling member and said output member permitting said coupling member to move in one direction relative to said output member and preventing said coupling member from moving in the opposite direction relative to said output member.

* * * * *